United States Patent [19]

Vitaloni

[11] Patent Number: 4,981,350
[45] Date of Patent: Jan. 1, 1991

[54] SECTIONAL MOLDABLE SPECTACLE FRAME

[75] Inventor: Alberto Vitaloni, Turin, Italy

[73] Assignee: Nico S.R.L., Turin, Italy

[21] Appl. No.: 472,773

[22] Filed: Jan. 31, 1990

[30] Foreign Application Priority Data

Mar. 10, 1989 [IT] Italy ............................ 52932/89[U]

[51] Int. Cl.$^5$ ............................................ G02C 11/02
[52] U.S. Cl. ...................................... 351/52; 351/41; 351/47; 351/86; 351/154
[58] Field of Search .................. 351/41, 47, 48, 51, 351/52, 57, 58, 85, 86, 102, 107, 154, 178

[56] References Cited

U.S. PATENT DOCUMENTS

| | | | |
|---|---|---|---|
| 2,482,144 | 9/1949 | Allen | D16/102 |
| 2,781,693 | 2/1957 | Brumby | 351/51 |
| 3,179,950 | 9/1965 | Gross et al. | 351/52 |

*Primary Examiner*—Rodney B. Bovernick
*Attorney, Agent, or Firm*—Helfgott & Karas

[57] ABSTRACT

A spectacle frame comprising a hollow U-shaped base structure with bars pivotally mounted at the ends thereof and a pair of lever members pivotally mounted in the middle of the base structure and attachable by snap action to the upside of the base structure. Decorative eyebrow members are attachable by snap action of projections and recesses to the lever members.

8 Claims, 2 Drawing Sheets

SECTIONAL MOLDABLE SPECTACLE FRAME

This invention relates to a sectional moldable spectacle frame.

It is known that at present spectacle frames, both of spectacles for improving the sight and sunglasses, have most various shapes, following the rules of fashion, technique and individual needs.

The Applicants of the present patent application are already the holders of two similar patent applications in Italy, relating to sectional moldable spectacle frames.

The present patent application relates to an improvement in the structures described and illustrated in the aforementioned applications so that the subject matter of the present invention is a particular structure of a sectional moldable spectacle frame in which a particular system of mounting both of the lens holders and the "eyebrows" is used.

It is to be understood that the term "eyebrows" as used herein is intended to indicate those decorative elements which are arranged above the frame of the lunettes of the spectacles and which have a different form according to the style and type of the spectacles.

The sectional moldable spectacle frame according to the invention is essentially formed of a substantially hollow U-shaped base structure at the ends of which the bars are pivotally mounted which may or may not be flexible. In the vicinity of the middle or nosepiece of the base structure, a pair of lever members is mounted, one on each side. Each of the lever members terminates at one end with an angularly bent-off portion adapted to lock the lens holder in position when the lever member is depressed. At the other end each lever member terminates with a recess adapted to receive with a snapping movement a projection provided on the framework and lock it in position. The framework is made hollow to accomodate the lever members therein. The lever members are provided with at least two recesses to receive projections on the eyebrow members. These recesses for receiving the projections of the eyebrow members are undercut or made in mushroom shape to accomodate the projections of similar shape and prevent them from leaving the recesses when the lever members are depressed. The lever members are secured to the framework by a simple depressing snapping movement irrespective of whether the eyebrow members are secured or are not secured to the lever members. When the lever members are depressed, the spectacles are ready for use with the lens holders secured to the frame.

It is evident that this depression of the level elements will lock the lens carrying nosepiece to the framework and the spectacles are ready for use independently of whether the eyebrow members are applied or are not applied to the lever members.

According to a further feature of the present invention the projections for insertion of the eye-brow members in the recesses provided in the locking rods are located below the eyebrow members and are inserted sideways into the recesses of the rods.

DESCRIPTION OF PREFERRED EMBODIMENT

Figure 1:
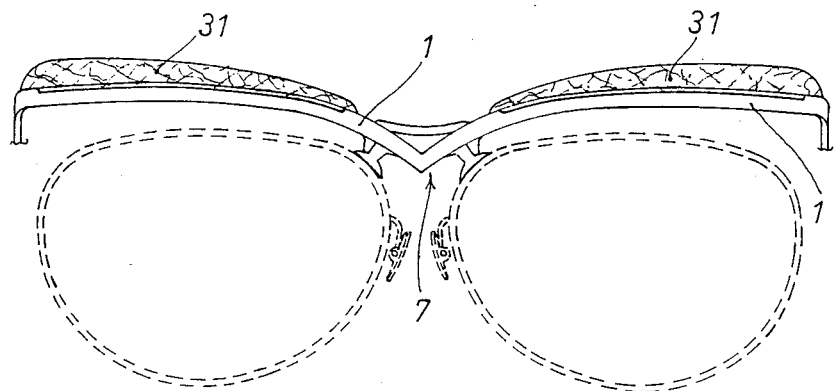
FIG. 1 is a schematic front view of a sectional moldable spectacle frame according to the invention, shown with the eyebrow members mounted thereon.
Figure 2:
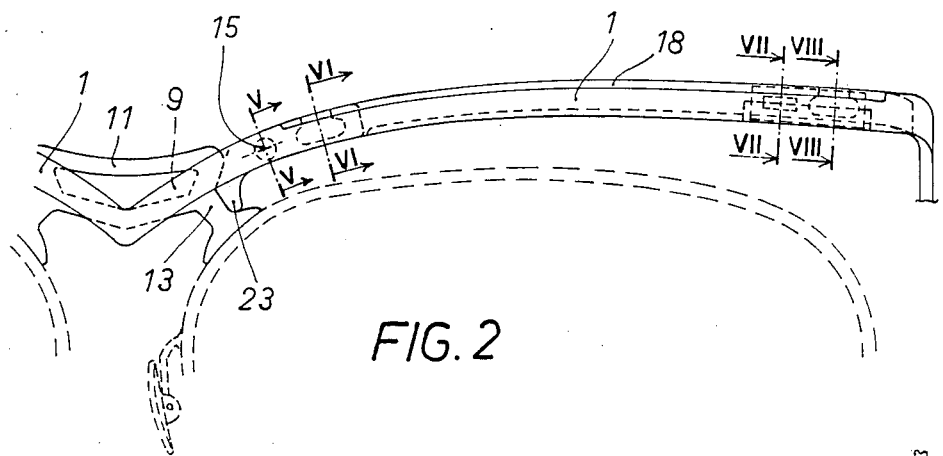
FIG. 2 is a schematic partial front view of the spectacle framework of the spectacle frame of FIG. 1.
Figure 3:
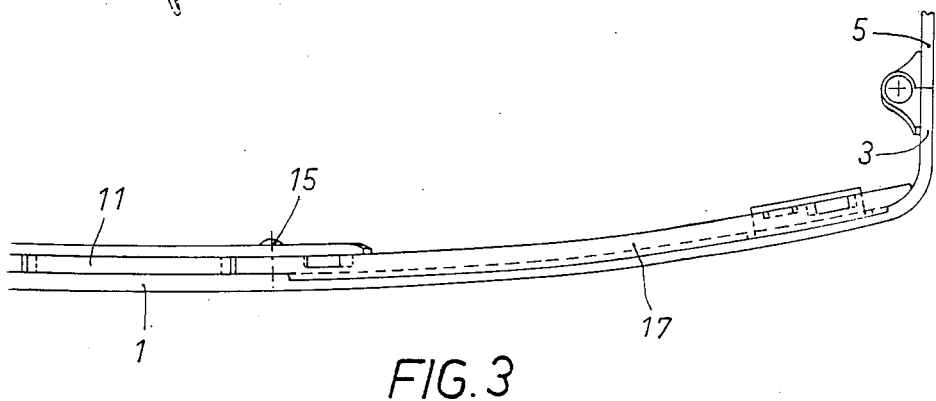
FIG. 3 is a top plan view of the framework of FIG. 2.

As shown in FIGS. 1 to 4, a spectacle frame according to the invention substantially comprises a hollow base framework 1 at the ends 3 of which the bars 5, which may or may not be flexible, are pivotally mounted. In the middle 7 of the framework 1 there is a recess 9 in which a central portion 11 of a lens carrying nosepiece 13 is inserted.

Locking members or levers 17 for locking the lens carrying nosepiece 13 are pivotally mounted at 15 in the vicinity of the central portion 11. Provided at the ends of the levers 17 are snap locking means formed by a projection 19 at each end of the framework 1 and a recess 21 in each of the levers 17.

The levers 17 for locking the lens carrying nosepiece 13, in the area facing the middle of the spectacles, terminate with a convex flat portion 23 adapted to be coupled to respective likewise flat concave portions 25 of the lens carrying nosepiece 13.

Figure 4:
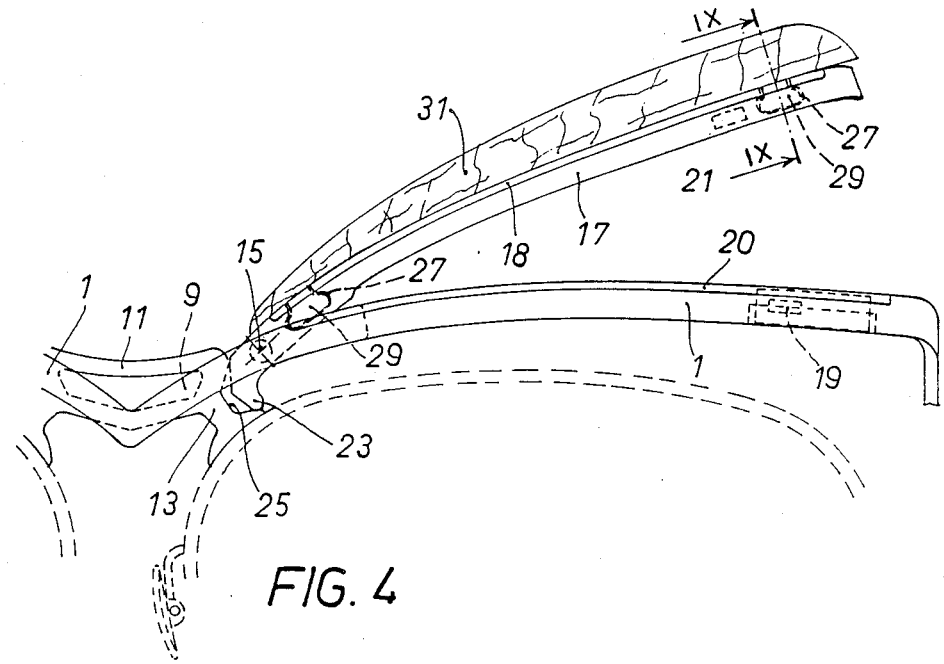
FIG. 4 is a front view of a lever member of the spectacle frame, the lever member being shown in the elevated position, with an eyebrow member attached thereto.
Figure 5:
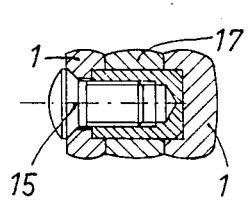
FIG. 5 is a cross section taken along the line V—V in FIG. 2 and showing the pivot for pivotally mounting the lever member on the frame.
Figure 6:
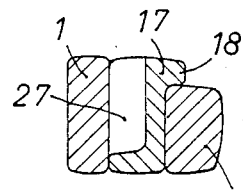
FIG. 6 is a cross section taken along the line VI—VI in FIG. 2 and showing the coupling between the framework and the lever member without an eyebrow member applied thereto.
Figure 7:
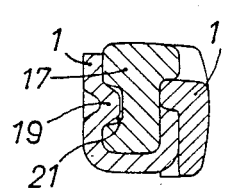
FIG. 7 is a section taken along the line VII—VII in FIG. 2 and showing how the end of the locking lever is secured by snap action to the framework.
Figure 8:
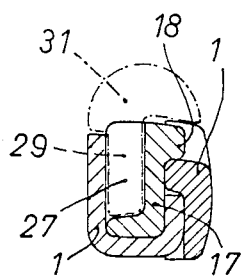
FIG. 8 is a cross section taken along the line VIII—VIII in FIG. 2 and showing the coupling between the locking lever and the framework, with an eyebrow member attached thereto, shown in dash-and-dot lines.
Figure 9:
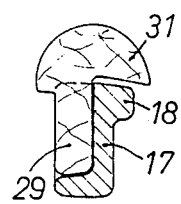
FIG. 9 is a schematic view showing the coupling between the eyebrow member and the locking lever.

As shown in FIG. 4, each of the levers 17 is provided with two recesses 27 for insertion of corresponding projections 29 provided on the eyebrow members 31 for securing the latter to the levers 17.

It is to be noted that the recesses 27 are undercut or in mushroom shape to accomodate the projections 29 of the eyebrow members 31 to prevent them from leaving the recesses when the levers 17 are depressed.

It is further to be noted that each lever member 17 beyond the pivot point 15 has a substantially Z-shaped cross section so as to form a rib 18 when the levers 17 are depressed, the rib 18 being flush with the framework 1 and abutting the recess 20 thereof.

Another point to be noted, which is typical of the present frame, consists in that due to its very structure it permits an easy composition of various elements with different forms and colors without using tools or adhesive connections.

It is known that the eyebrow members are typical elements preferred by ladies; however, with the present spectacle frame they may or may not be inserted depending on the type of spectacles and as desired by the user.

In the accompanying drawings, which are given by way of a non-limiting example, it is obvious that the eyebrow members 31 are shown merely as an indicative example and for the purpose of showing how they are secured to the rods 17.

Although the invention has thus been described in detail and illustrated in the accompanying drawings, it is to be understood that the invention is not limited to the described embodiment and that numerous changes and modifications may be made therein without departing from the scope of the invention as defined by the appended claims.

I claim:

1. A sectional moldable spectacle frame substantially comprising a hollow U-shaped base structure with bars pivotally mounted at the ends thereof;
   a pair of lever members pivotally mounted in the vicinity of the middle of said base structure, one on each side;
   a lens carrying nosepiece in the middle between said lever members, said nosepiece carrying a pair of lens holders, each of said lever members terminating at one end thereof with an angularly bent-off portion adapted to lock said lens holders in position when said lever member is depressed, and each of said lever members terminating at the other end thereof with a recess adapted to receive with a snapping movement a projection provided on said base structure and lock it in position, said base structure being made hollow to accomodate said lever members therein;
   an eyebrow member attachable to each of said lever members, said lever members being provided with at least two recesses to receive projections on said eyebrow members, said recesses being of an appropriate shape to accomodate said projections of similar shape and prevent them from leaving said recesses when said lever members are depressed, said lever member being secured to said base structure by a simple depressing snapping movement irrespective of whether said eyebrow members are secured to said lever members.

2. A sectional moldable spectacle frame as claimed in claim 1, wherein said recesses for receiving said projections of said eyebrow members are made in mushroom shape.

3. A sectional moldable spectacle frame as claimed in claim 1, wherein said recesses for receiving said projections of said eyebrow members are undercut.

4. A sectional moldable spectacle frame as claimed in claim 1, wherein said projections for insertion of said eyebrow members in said recesses in said lever members are arranged below said eyebrow members and are adapted to be inserted sideways in said recesses in said lever members.

5. A sectional moldable spectacle frame as claimed in claim 1, wherein snap locking of said lever members in the base structure is obtained by a lateral interlocking action between said projection of said base structure and said recess in each of said lever members.

6. A sectional moldable spectacle frame as claimed in claim 1, wherein each of said lever members is pivotally mounted on said base structure and beyond the point of pivotal connection thereto has a substantially Z-shaped cross section so as to form, when said lever member is depressed, a rib extending flush with said base structure and abutting said recess therein.

7. A sectional moldable spectacle frame as claimed in claim 1, wherein each of said lever members is pivotally mounted on said base structure by means of a pivot formed integrally with said base structure and adapted to be inserted by snap action in a groove in said lever member.

8. A sectional moldable spectacle frame as claimed in claim 1, wherein its component parts and structure are such as to permit easy composition of the various component parts with different shapes and colors without using tools and adhesive connections.

* * * * *